(12) United States Patent
Zimmermann

(10) Patent No.: US 8,949,853 B2
(45) Date of Patent: Feb. 3, 2015

(54) USING STAGES TO HANDLE DEPENDENCIES IN PARALLEL TASKS

(75) Inventor: Mario Mendes de Oliveira Zimmermann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 13/197,797

(22) Filed: Aug. 4, 2011

(65) Prior Publication Data

US 2013/0036425 A1 Feb. 7, 2013

(51) Int. Cl.
*G06F 9/46* (2006.01)
*G06F 9/48* (2006.01)

(52) U.S. Cl.
CPC .................................. *G06F 9/4881* (2013.01)
USPC .......................................... 718/106; 718/104

(58) Field of Classification Search
None
See application file for complete search history.

(56) References Cited

U.S. PATENT DOCUMENTS

| | | | |
|---|---|---|---|
| 6,330,583 B1 * | 12/2001 | Reiffin ........................... | 718/105 |
| 6,865,591 B1 | 3/2005 | Garg et al. | |
| 7,069,298 B2 | 6/2006 | Zhu et al. | |
| 7,137,116 B2 * | 11/2006 | Parkes et al. ................... | 718/102 |
| 7,647,594 B2 * | 1/2010 | Togawa ........................... | 718/108 |
| 7,904,907 B2 | 3/2011 | Jiang et al. | |
| 7,930,700 B1 * | 4/2011 | Basu et al. ....................... | 718/102 |
| 8,015,564 B1 * | 9/2011 | Beyer et al. ..................... | 718/100 |
| 8,209,702 B1 * | 6/2012 | Roytman et al. ............... | 718/106 |
| 8,281,313 B1 * | 10/2012 | Santos et al. ................... | 718/106 |
| 2004/0268355 A1 | 12/2004 | Robin et al. | |
| 2006/0195821 A1 * | 8/2006 | Vanspauwen et al. ......... | 717/124 |
| 2006/0288346 A1 * | 12/2006 | Santos et al. ................... | 718/102 |
| 2007/0101013 A1 * | 5/2007 | Howson ........................ | 709/231 |
| 2007/0185754 A1 * | 8/2007 | Schmidt ............................ | 705/9 |
| 2008/0040725 A1 * | 2/2008 | Moss ............................. | 718/106 |
| 2008/0066072 A1 * | 3/2008 | Yurekli et al. ................. | 718/104 |
| 2008/0255682 A1 | 10/2008 | Zhao et al. | |
| 2009/0125359 A1 * | 5/2009 | Knapic et al. ....................... | 705/8 |
| 2010/0070328 A1 * | 3/2010 | Motoyama et al. ............... | 705/9 |
| 2011/0004881 A1 * | 1/2011 | Terechko et al. ............. | 718/102 |
| 2011/0209153 A1 * | 8/2011 | Suzuki et al. ................. | 718/102 |
| 2011/0231817 A1 | 9/2011 | Hadar et al. | |
| 2011/0276966 A1 * | 11/2011 | Christensen et al. ......... | 718/100 |
| 2012/0151486 A1 * | 6/2012 | Owen et al. .................... | 718/100 |

(Continued)

OTHER PUBLICATIONS

Sudduth, Jr, Jerrry, L., "Optimistic Concurrency Control Pattern", Retrieved at <<https://agora.cs.illinois.edu/download/attachments/26574284/Optimistic+Concurrency+Control+Pattern+-+v1.0+-+20091208.pdf>>, Dec. 8, 2009, pp. 10.

(Continued)

*Primary Examiner* — Emerson Puente
*Assistant Examiner* — Mehran Kamran
(74) *Attorney, Agent, or Firm* — Ben Tabor; Kate Drakos; Micky Minhas

(57) ABSTRACT

Technologies are described herein for using stages for managing dependencies between tasks executed in parallel. A request for permission to execute a task from a group or batch of tasks is received. The specified task is retrieved from a task definition list defining a task ID, stage, and maximum stage for each task in the group. If another pending or currently running task exists with a stage and maximum stage less than the stage defined for the retrieved task, then the retrieved task is not allowed to run. If no other pending or currently running task exists with a stage and maximum stage less than the stage defined for the retrieved task, then the permission to execute the specified task is given.

20 Claims, 4 Drawing Sheets

(56) References Cited

U.S. PATENT DOCUMENTS

2012/0159507 A1* 6/2012 Kwon et al. .................. 718/104
2013/0103977 A1 4/2013 Zimmermann

OTHER PUBLICATIONS

Ahluwalia et al., "High Availability Design Patterns," Oct. 21, 2006, In the Proceedings of the 2006 Conference on Pattern Languages of Programs, 9 pp.
Wolf, Friedhelm, "Component-based Fault Tolerance for Distributed Real-Time and Embedded Systems," May 2009, Thesis, Graduate School of Vanderbilt University, 71pp.
Barbosa, Raul, "Layered Fault Tolerance for Distributed Embedded Systems," Nov. 2008, Thesis, Chalmers University of Technology, 195pp.
Arlat et al., "Fault Tolerant Computing," Apr. 1, 2012, retrieved at http://homepages.laas,fr/deswarte/Publications/98005.pdf, 97pp.
Garg et al., " A Review of Fault Tolerant Checkpointing Protocols for Mobile Computing Systems," Jun. 2010, International Jourmnal of Computer Applications, 3(2): 8-19.
Gawand et al., "Design Patterns to Implement Safety and Fault," Mar. 2011, International Journal of Computer Applications, 18(2): 6-13.
Kalinsky, David, "Design Patterns for High Availability," Jul. 31, 2002, retrievde from http://www.embedded.com/design/embedded/4024434/Design-Paterns-for-High-Availability, 8 pp.
Saridakis, Titos, "A System of Patterns for Fault Tolerance," Sep. 27, 2010, retrieved from http://hillside.net/eurplop/HillsideEurope/Papers/EuroPLoP2002/2002_Saridakis_ASystemOfPatternsForFaultTolerance.pdf, 48pp.
"An Essential design pattern for fault-tolerant distributed state sharing (Recoverable Distributor)," Oct. 1, 1996, Communications of the ACM, retrieved from http://www.accessmylibrary.com/article-1G1-18838816/essential-design-[attern-fault.html, 9pp.

* cited by examiner

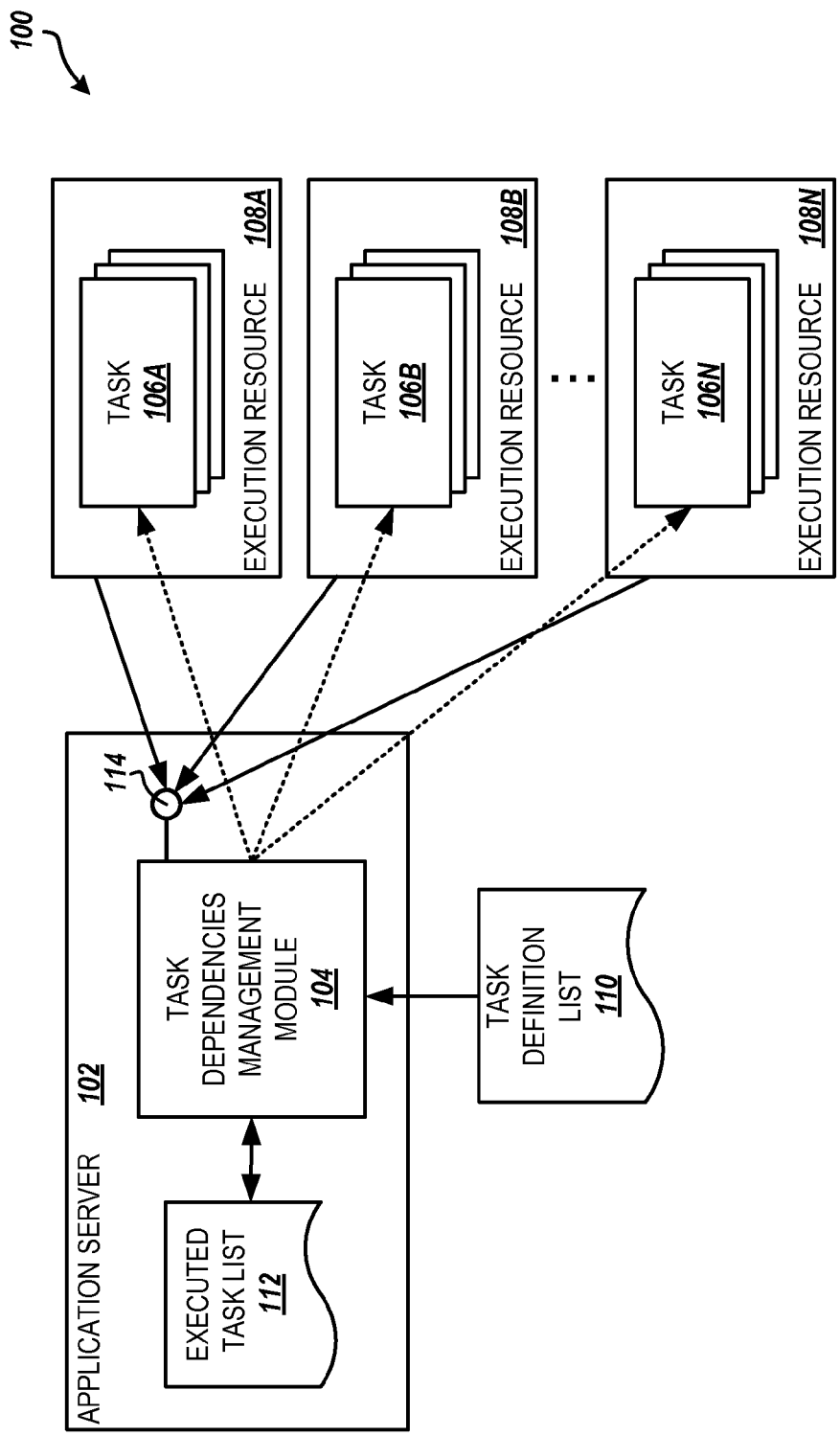

```xml
<Task Name="BVT_Client-BecWebService.xml"            Stage="001" MaximumStage="019" />
<Task Name="BVT_Client-Connector_BVT.xml"            Stage="001" MaximumStage="019" />
<Task Name="BVT_Client-Powershell_ExtendedTests.xml" Stage="001" MaximumStage="019" />
<Task Name="BVT_Client-FederatedIdentity_ExtendedTests.xml" Stage="001" MaximumStage="019" />
<Task Name="BVT_AuthZExtendedTests.xml"              Stage="001" MaximumStage="001" />
<Task Name="BVT_Aws.xml"                             Stage="002" MaximumStage="002" />
<Task Name="BVT_ApiEtcendedTests.xml"                Stage="003" MaximumStage="003" />
<Task Name="BVT_DSAPIExtendedTests.xml"              Stage="004" MaximumStage="004" />
<Task Name="BVT_IdentityExtendedTest.xml"            Stage="005" MaximumStage="005" />
<Task Name="BVT_WorkflowsExtendedTests.xml"          Stage="006" MaximumStage="006" />
<Task Name="BVT_CompanyManagerExtendedTests.xml"     Stage="007" MaximumStage="007" />
<Task Name="BVT_monitoringStxFramework.xml"          Stage="008" MaximumStage="008" />
<Task Name="BVT_MouseConsole_AdminExtTests.xml"      Stage="009" MaximumStage="009" />
...
<Task Name="BVT_SyncServiceExtendedTests.xml"        Stage="011" MaximumStage="011" />
<Task Name="BVT_SyncToADExtendedTests.xml"           Stage="012" MaximumStage="012" />
<Task Name="BVT_SyncFromExchange_ExtendedTests.xml"  Stage="013" MaximumStage="013" />
<Task Name="BVT_ProvisioningTests.xml"               Stage="014" MaximumStage="014" />
<Task Name="BVT_PropagationTasks.xml"                Stage="016" MaximumStage="016" />
<Task Name="BVT_PropagationServiceExtendedTesct.xml" Stage="017" MaximumStage="017" />
...
<Task Name="BVT_SubscriptionExtendedTests.xml"       Stage="020" MaximumStage="020" />
<Task Name="UnlistedBVTTasks"                        Stage="022" MaximumStage="120" />
```

FIG. 2

USING STAGES TO HANDLE DEPENDENCIES IN PARALLEL TASKS

BACKGROUND

A system administrator or developer in a computer system environment may often be required to execute a large list of tasks or processes. The easiest way to schedule the list of tasks is to run them sequentially. This solution may not be optimal, however, because of underutilized execution resources and increased total time of execution of the tasks.

While running the tasks in parallel may be more efficient, it may also be more complicated due to dependencies that exist between tasks in the list. For example, some tasks may temporarily change the topology of the system in such a way that other tasks running in parallel would fail. Other tasks may depend upon the output or changes to data generated by previously executed tasks in the list.

An optimum approach may be to run as many tasks in the list in parallel as possible while taking into consideration these dependencies between tasks. However, analyzing dependencies between large numbers of tasks to produce an execution schedule may be complex. In addition, frequent changes to the environment may require the dependencies be changed frequently, and maintenance of the complex set of dependencies may be difficult and costly.

It is with respect to these considerations and others that the disclosure made herein is presented.

SUMMARY

Technologies are described herein for using stages for managing dependencies between tasks executed in parallel. Utilizing the technologies presented herein, extra abstraction layer "stages" may be added to the definition of a group or batch of tasks to be executed in order to handle dependencies that may exist between tasks. Using stages defined for each task may allow a maximum number of tasks to be executed in parallel while preventing tasks with dependencies from executing at the same time. In addition, each task is mapped to only one rule, i.e. a stage and maximum stage, defined for each task, making the maintenance of the task definitions manageable and the solution highly scalable.

According to embodiments, a request for permission to execute a task from the group or batch of tasks is received. The specified task is retrieved from a task definition list defining a task identifier ("ID"), stage, and maximum stage for each task. If another pending or currently running task exists with a stage and maximum stage less than the stage defined for the retrieved task, then the specified task is not allowed to run. If no other pending or currently running task exists with a stage and maximum stage less than the stage defined for the retrieved task, then permission to execute the specified task is given.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a block diagram showing aspects of an illustrative operating environment and several software components provided by the embodiments presented herein;

FIG. 2 is a listing showing a portion of a sample task definition list, according to embodiments described herein;

DETAILED DESCRIPTION

Figure 3:
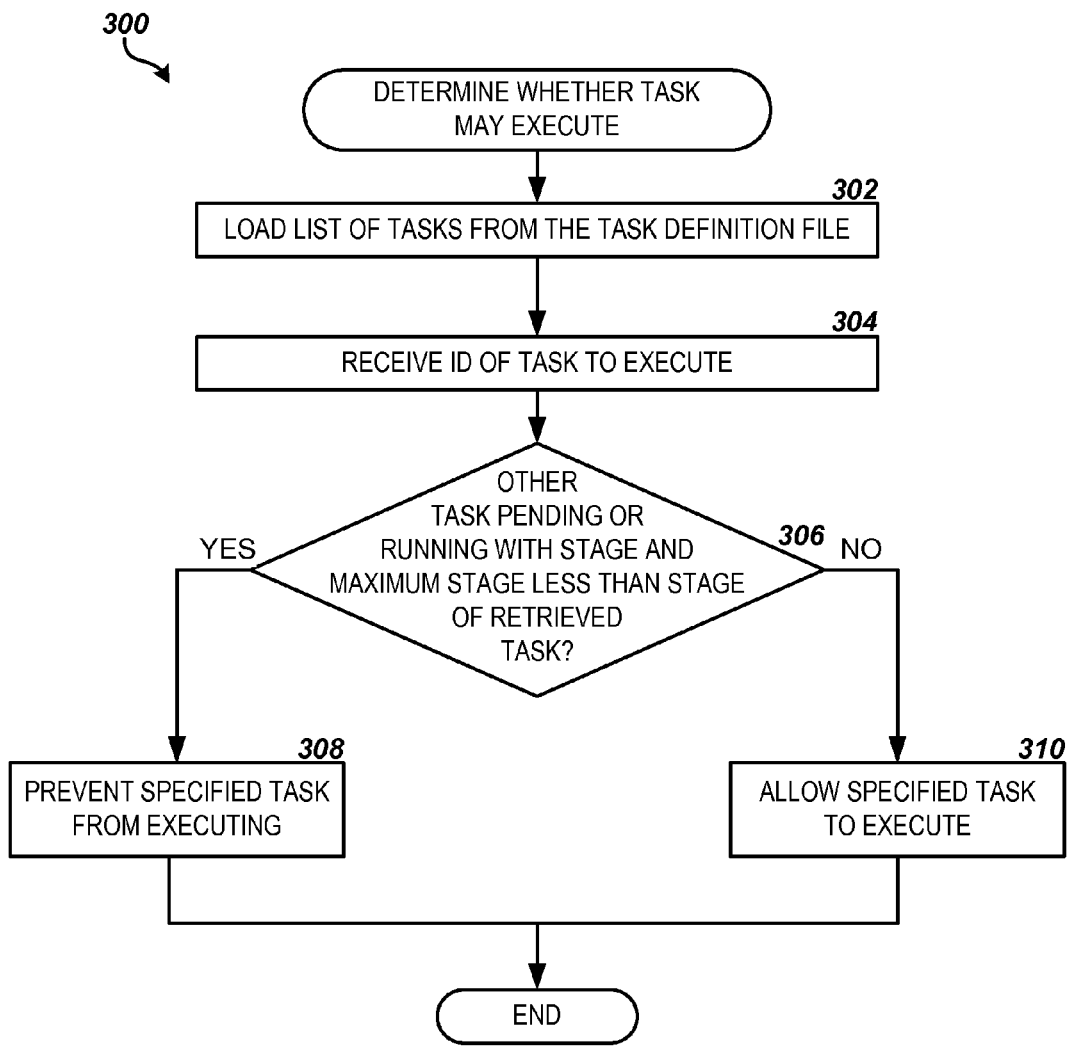
FIG. 3 is a flow diagram showing methods for using stages for managing dependencies between tasks executed in parallel, according to embodiments described herein.

The following detailed description is directed to technologies for using stages for managing dependencies between tasks executed in parallel. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

FIG. 1 shows an illustrative operating environment 100 including several software components for using stages for managing dependencies between tasks executed in parallel, according to embodiments provided herein. The environment 100 includes an application server 102. The application server 102 may represent one or more conventional server computers, Web servers, database servers, or network appliances. Alternatively, the application server 102 may represent a user computing device, such as a personal computer ("PC"), a desktop workstation, a laptop, a notebook, a mobile device, a personal digital assistant ("PDA"), and the like. It will be appreciated that the application server 102 may represent any server computers or user computing devices known in the art.

The application server 102 executes a task dependencies management module 104. According to one embodiment, the task dependencies management module 104 is responsible for managing the dependencies in the parallel execution of a number of tasks 106A-106N (referred to herein generally as tasks 106) on a number of execution resources 108A-108N (referred to herein generally as execution resources 108) in the operating environment 100. The task dependencies management module 104 may be implemented as hardware, software, or a combination of the two. The task dependencies management module 104 may be an add-in or component of a batch processing system, a software testing suite, or the like, and may include a number of application program modules and other components executing on the application server 102 and/or other computers or computing devices.

The tasks 106 may include any computer-executable instructions presented in any form, such as software programs, application modules, database scripts, stored procedures, system scripts, testing profiles, and the like. The execution resources 108 may include computing resources for executing the tasks, such as CPUs, virtual machines, execution threads, runtime engines, batch processors, database engines, testing engines, and the like. The execution resources 108 may be provided by the application server 102 and/or one or more other computers or computing devices in the operating environment 100.

According to embodiments, the tasks 106 for parallel execution are defined in a task definition list 110. The task definition list 110 includes a definition of each task 106 to be executed. In one embodiment, the definition of each task 106 in the task definition list 110 comprises a tuple including a task ID identifying the task to be executed, a numeric stage of execution for the task, and a maximum stage indicating a maximum stage of execution that can be executed in parallel with the task. The stage and maximum stage of each task are used by the task dependencies management module 104 to determine which tasks 106 defined in the task definition list 110 may be executed in parallel. The stages and maximum stages defined in the task definition list 110 may be based on the dependencies between the tasks. According to embodiments, each task 106 is assigned to only one stage, and each stage may contain multiple tasks. Tasks 106 assigned to the same stage may run in parallel. In addition, all the tasks 106 assigned to stages that are less than a current maximum stage can also be executed in parallel.

Therefore, the task dependencies management module 104 may determine if a particular task 106 may be executed based on the stage and/or maximum stage of all other pending or running tasks. Particularly, a task A with stage SA and maximum stage MA will be allowed to execute unless another task B is pending or currently running with stage SB less than SA and maximum stage MB less than SA. For example, the task definition list 110 may include four tuples defining four tasks A, B, C, and D, as shown below in Table 1.

TABLE 1

Example Task Definitions (Task ID = A, Stage = 01, Maximum Stage = 05)
(Task ID = B, Stage = 01, Maximum Stage = 01)
(Task ID = C, Stage = 02, Maximum Stage = 02)
(Task ID = D, Stage = 10, Maximum Stage = 10)

According to the task definitions shown in Table 1, task A will be allowed to execute at any time, since no other defined task has a maximum stage less than the stage SA of task A, i.e. MB>=SA, MC>=SA, and MD>=SA. Task B may also execute at any time for the same reasons (MA>=SB, MC>=SB, and MD>=SB). However, task C may only execute after task B is complete, because while the maximum stage MA of task A and the maximum stage MD of task D are both greater than or equal to the stage SC, i.e. MA>=SC and MD>=SC, the maximum stage MB of task B is less than the stage SC. Similarly, task D may only be executed alone, once tasks A, B, and C are complete (MA<SD, MB<SD, MC<SD).

In one embodiment, the task definition list 110 may comprise an extensible markup language ("XML") file with a node defining each task 106. FIG. 2 shows a sample portion of XML 200 from a task definition list 110, according to the embodiment. The XML 200 may include a Task node 202 for each task 106. The task node 202 may include a Name attribute 204 identifying a script, profile, or definition of the associated task 106. The task node 202 also includes a Stage attribute 206 specifying the numeric stage of the task, and a MaximumStage attribute 208 specifying the maximum stage. For example, as shown in FIG. 2, a task 106 identified as "BVT_Client-BecWebService.xml" may have a stage of "001" and a maximum stage of "019." In another embodiment, the Task nodes 202 may be grouped under a parent node, such as a Batch, Group, or Cycle node, with its own name or identifier, and multiple batches or groups may be defined in the task definition list 110.

According to the task definition list 110 defined by the XML 200, all tasks 106 in the listing except "BVT_SubscriptionExtendedTests.xml" and "UnlistedBVTProfiles" would be allowed to run in parallel with the task "BVT_Client-BecWebService.xml." Similarly, the task "BVT_AuthZExtendedTests.xml" is set to execute in stage "001," but only other tasks assigned to stage "001" may run in parallel with the task. Therefore, the task "BVT_Aws.xml," which is set to execute in stage "002," will not be allowed to execute until the "BVT_AuthZExtendedTests.xml" has completed.

In other embodiments, the task definition list 110 may be stored in a delimited flat file, a database table, or any other mechanism known in the art for storing structured data. As further shown in FIG. 2, each task 106 has only one associated entry in the task definition list 110, making the listing easy to maintain and ensuring that the solution scales well. The concept of stages may also allow for increased maintainability as it groups parallel tasks in the same stage. Once the tasks are mapped to stages in the task definition list 110, the task dependencies management module 104 need only read the stage configuration and base the decision whether to run a task on the stage and maximum stage data. There is no extra design effort required from system administrators or developers.

According to one embodiment, the task dependencies management module 104 reads and parses the task definition list 110 in order to provide an indication of whether a particular task is allowed to execute or not upon request for permission to execute the task from an execution resource 108. The task dependencies management module 104 may implement an application programming interface ("API") 114 that is used by the execution resources 108 to determine whether tasks 106 may be executed based on the defined dependencies. When an execution resource 108 becomes available, the execution resource may utilize the API 114 to request permission to execute a particular task 106 from the task dependencies management module 104 by specifying the task ID, such as the task Name attribute 206, for example. The task dependencies management module 104 may utilize the stage and maximum stage defined for the identified task 106 in the task definition list 110, along with knowledge of the completed and currently executing tasks, to determine if the requested task can currently be executed, using a procedure similar to that described below in regard to FIG. 3. The task dependencies management module 104 may then return an indication of whether the specified task 106 may currently be executed to the requesting execution resource 108.

The execution resources 108 may also utilize the API 114 to update the task dependencies management module 104 on the completion of a particular task 106 as well as whether the task completed successfully or not. The task dependencies management module 104 may track the completed tasks 106 and/or the currently executing tasks in an executed task list 112. The executed task list 112 may be utilized to determine whether a particular task 106 may be executed, as described above. The executed task list 112 may be stored in a memory of the application server 102, or may be stored in a database or other storage mechanism accessible by the server.

According to another embodiment, the task dependencies management module 104 reads the task definitions from the task definition list 110 and initiates execution of the defined tasks 106 in stage order on the available execution resources 108 in the environment 100. The task dependencies management module 104 may further monitor execution of the tasks 106 on the execution resources 108 to determine when a task completes and an execution resource becomes available. Upon completion of a task 106 and/or an execution resource 108 becoming available, the task dependencies management module 104 utilizes the stage and maximum stage defined for each task to determine which task(s) may be executed next.

In a further embodiment, the task definition list 110 is parsed and the task definitions contained therein are stored in a table of a database on the application server 102. The executed task list 112 may also be stored in the database, and the functionality required by the task dependencies management module 104 to determine whether a particular task may execute, as will be described below in regard to FIG. 3, may be implemented in stored procedures. The database may expose the API 114 and the stored procedures executed to handle each request made by an execution resource 108, as described above.

Referring now to FIG. 3, additional details will be provided regarding the embodiments presented herein. It should be appreciated that the logical operations described with respect to FIG. 3 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates one routine 300 for determining whether a specified task 106 may be executed based on the stage and maximum stage defined for the tasks in the task definition list 110. According to one embodiment, the routine 300 may be performed by the task dependencies management module 104 executing on the application server 102 and/or other servers or computing devices. It will be appreciated that the routine 300 may also be performed by other modules or components executing on other computing devices, or by any combination of modules, components, and computing devices. As described above, the routine 300 may be performed by the task dependencies management module 104 in response to a request by an execution resource via the API 114 for permission to execute a particular task 106.

The routine 300 begins at operation 302, where the task dependencies management module 104 loads a list of tasks from the task definition list 110. As described above in regard to FIG. 1, the task definition list 110 may comprise one or more tuples defining a task ID, stage, and maximum stage for each task. According to embodiments, the list of tasks parsed from the task definition list 110 may be stored in memory of the application server 102 or in a database table or other storage mechanism accessible by the server. It will be appreciated that the operation 302 to load the list of tasks from the task definition list 110 may only be executed once by the task dependencies management module 104 at the beginning of the execution of a group or batch of tasks defined in the task definition list, instead of upon every request.

From operation 302, the routine 300 proceeds to operation 304, where the task dependencies management module 104 receives the task ID of the task 106 to be executed. For example, an execution resource 108 may utilize the API 114 of the task dependencies management module 104 to request permission to execute a particular task 106. The request may specify a task ID of the task 106, such as the task Name attribute 206 described above in regard to FIG. 2.

The routine 300 then proceeds from operation 304 to operation 306, where the task dependencies management module 104 determines whether the specified task may be executed based on the stage and maximum stage of all other pending or running tasks 106. Particularly, the task dependencies management module 104 determines if any pending or currently running task 106 has a stage or maximum stage that is less than the stage defined for the specified task. If another task B is pending or currently running with a stage SB less than the stage SA of the retrieved task and a maximum stage MB less than SA, the specified task is not allowed to run in parallel with or prior to the other task, and the routine 300 proceeds to operation 304, where the task dependencies management module 104 prevents the specified task from being executed. For example, the task dependencies management module 104 may respond to the requesting execution resource 108 with an indicator indicating that the specified task may not be executed at this time.

However, if no other pending or currently running task 106 has a stage or maximum stage that is less than the stage defined for the specified task, then the routine 300 proceeds from operation 306 to operation 310, where the specified task is allowed to execute. For example, the task dependencies management module 104 may respond to the requesting execution resource 108 with an indicator indicating that the task may be executed. From operations 308 or 310, the routine 300 ends.

In a further embodiment, a client module may execute on a remote computer and manage the execution of the tasks 106 defined in a local list or group of tasks on a subset of the execution resources 108. Upon detecting that an execution resource 108 is available, the client module may determine the next task in the local list of tasks to be executed, and utilize the API 114 of the task dependencies management module 104 to request permission to execute the task, by providing a task ID, for example. The task execution module 104 will utilize the routine 300 described above to determine if the task is allowed to execute based on the stage and maximum stage of the other pending and currently running tasks, as determined from the list of tasks and the executed task list 112.

The task execution module 104 may then respond to the client module with an indicator indicating whether the task may be executed or not. If the task may be executed, then the client module will initiate the task 106 on the available execution resource 108. If the task may not be executed, then the client module will select the next task in the local task list for execution and request permission for execution of that task from the task dependencies management module 104. In another embodiment, the client module may execute on the same application server 102 as the task dependencies management module 104 or may be a component of the task dependencies management module, and the local task list may be the task definition list 116.

Figure 4:
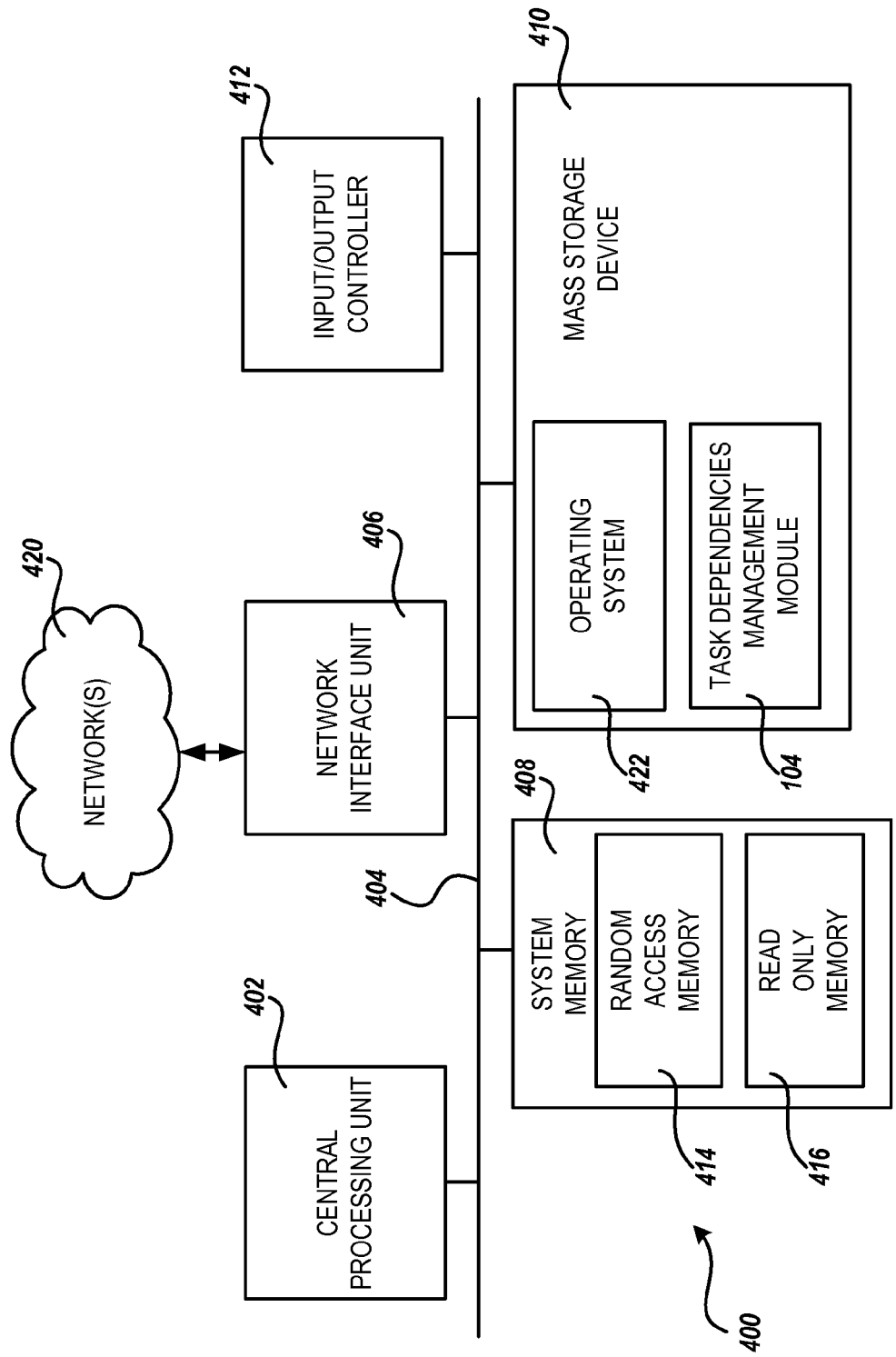
FIG. 4 is a block diagram showing an illustrative computer hardware and software architecture for a computing system capable of implementing aspects of the embodiments presented herein.

FIG. 4 shows an example computer architecture for a computer 400 capable of executing the software components described herein for using stages for managing dependencies between tasks executed in parallel, in the manner presented above. The computer architecture shown in FIG. 4 illustrates a conventional server computer, desktop computer, laptop, notebook, PDA, wireless phone, or other computing device, and may be utilized to execute any aspects of the software components presented herein described as executing on the application server 102 or other computing device.

The computer architecture shown in FIG. 4 includes one or more central processing units ("CPUs") 402. The CPUs 402 may be standard processors that perform the arithmetic and logical operations necessary for the operation of the computer 400. The CPUs 402 perform the necessary operations by transitioning from one discrete, physical state to the next through the manipulation of switching elements that differentiating between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 408, including a random access memory ("RAM") 414 and a read-only memory 416 ("ROM"), and a system bus 404 that couples the memory to the CPUs 402. A basic input/output system containing the basic routines that help to transfer information between elements within the computer 400, such as during startup, is stored in the ROM 416. The computer 400 also includes a mass storage device 410 for storing an operating system 422, application programs, and other program modules, which are described in greater detail herein.

The mass storage device 410 is connected to the CPUs 402 through a mass storage controller (not shown) connected to the bus 404. The mass storage device 410 provides non-volatile storage for the computer 400. The computer 400 may store information on the mass storage device 410 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 400 may store information to the mass storage device 410 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 400 may further read information from the mass storage device 410 by detecting the physical states or characteristics of one or more particular locations within the mass storage device.

As mentioned briefly above, a number of program modules and data files may be stored in the mass storage device 410 and RAM 414 of the computer 400, including an operating system 418 suitable for controlling the operation of a computer. The mass storage device 410 and RAM 414 may also store one or more program modules. In particular, the mass storage device 410 and the RAM 414 may store the task dependencies management module 104, which was described in detail above in regard to FIG. 1. The mass storage device 410 and the RAM 414 may also store other types of program modules or data.

In addition to the mass storage device 410 described above, the computer 400 may have access to other computer-readable media to store and retrieve information, such as program modules, data structures, or other data. It should be appreciated by those skilled in the art that computer-readable media may be any available media that can be accessed by the computer 400, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data, but does not encompass transitory signals. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 400.

The computer-readable storage medium may be encoded with computer-executable instructions that, when loaded into the computer 400, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 400 by specifying how the CPUs 402 transition between states, as described above. According to one embodiment, the computer 400 may have access to computer-readable storage media storing computer-executable instructions that, when executed by the computer, perform the routine 300 for using stages for managing dependencies between tasks executed in parallel, described above in regard to FIG. 3.

According to various embodiments, the computer 400 may operate in a networked environment using logical connections to execution resources 108, remote computing devices, and computer systems through a network 420, such as a LAN, a WAN, the Internet, or a network of any topology known in the art. The computer 400 may connect to the network 420 through a network interface unit 406 connected to the bus 404. It should be appreciated that the network interface unit 406 may also be utilized to connect to other types of networks and remote computer systems.

The computer 400 may also include an input/output controller 412 for receiving and processing input from a number of input devices, including a keyboard, a mouse, a touchpad, a touch screen, an electronic stylus, or other type of input device. Similarly, the input/output controller 412 may provide output to a display device, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for using stages for managing dependencies between tasks executed in parallel are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for managing execution of a plurality of tasks in a computer system, the method comprising executing instructions in the computer system to perform the operations of:
    loading a task definition list comprising tuples defining the plurality of tasks, each task in the plurality of tasks having an associated stage and a maximum stage indicating a maximum stage of execution that can be executed in parallel with the task, wherein each task is assigned to one stage and each stage contains one or more tasks;
    receiving a specified task to be executed, the specified task having an associated stage;
    determining whether another pending or currently running task in the plurality of tasks exists with an associated stage less than the stage associated with the specified task and an associated maximum stage less than the stage associated with the specified task;
    upon determining that another pending or currently running task does exist with an associated stage less than the stage associated with the specified task and an associated maximum stage less than the stage associated with the specified task, preventing the specified task from executing; and
    upon determining that another pending or currently running task does not exist with an associated stage less than the stage associated with the specified task and an associated maximum stage less than the stage associated with the specified task, allowing the specified task to execute.

2. The computer-implemented method of claim 1, wherein the task definition list comprises an extensible markup language ("XML") file defining a single node for each task in the plurality of tasks.

3. The computer-implemented method of claim 2, wherein the node for each task comprises a task ID attribute, a stage attribute, and a maximum stage attribute.

4. The computer-implemented method of claim 3, further comprising tracking completed tasks in an executed task list.

5. The computer-implemented method of claim 1, wherein the plurality of tasks are executed and monitored by a task dependencies management module, the task dependencies management module retrieving a next task to execute from the task definition list and performing the determining and preventing or allowing operations upon completion of a previous task.

6. The computer-implemented method of claim 1, wherein a task dependencies management module implements an application program interface ("API") and performs the determining and preventing or allowing operations in response to a request for permission to execute the specified task received through the API.

7. The computer-implemented method of claim 6, wherein an execution resource requests permission to execute a next task from the task dependencies management module upon becoming available for execution of a task.

8. A computer-readable storage medium encoded with computer-executable instructions that, when executed by a computer, cause the computer to:
    receive a request for permission to execute a task;
    retrieve the task from a task definition list defining a plurality of tasks, each task in the plurality of tasks having an associated stage and a maximum stage indicating a maximum stage of execution that can be executed in parallel with the task, wherein each task is assigned to one stage and each stage contains one or more tasks;
    determine whether another pending or currently running task exists with an associated stage less than the stage associated with the retrieved task and an associated maximum stage less than the stage associated with the retrieved task;
    upon determining that another pending or currently running task does exist with an associated stage less than the stage associated with the retrieved task and an associated maximum stage less than the stage associated with the retrieved task, respond to the request with an indication that the task may not be executed; and
    upon determining that another pending or currently running task does not exist with an associated stage less than the stage associated with the retrieved task and an associated maximum stage less than the stage associated with the retrieved task, respond to the request with an indication that the task may be executed.

9. The computer-readable storage medium of claim 8, wherein the task definition list comprises an XML file defining a single node for each task in the plurality of tasks.

10. The computer-readable storage medium of claim 9, comprising further computer-executable instructions that cause the computer to load the XML file defining the plurality of tasks upon initiation of a group or batch comprising the plurality of tasks.

11. The computer-readable storage medium of claim 8, comprising further computer-executable instructions that cause the computer to track completed tasks in an executed task list.

12. The computer-readable storage medium of claim 8, wherein the request for permission to execute the task is received through an API from an execution resource upon becoming available for execution of a task.

13. The computer-readable storage medium of claim 12, wherein the execution resource further provides notification of a completion of a task in the plurality of tasks through the API.

14. A system for managing execution of a plurality of tasks, the system comprising:
    one or more processors; and
    a memory coupled to the one or more processors and containing a task dependencies management module configured to
    receive a request to execute a first task, retrieve a stage associated with the first task from a task definition list defining a plurality of tasks, each task in the plurality of tasks having an associated stage and a maximum stage indicating a maximum stage of execution that can be executed in parallel with the task, wherein each task is assigned to one stage and each stage contains one or more tasks, determine whether another pending or currently running task exists with an associated maximum stage less than the stage associated with the first task, upon determining that another pending or currently running task does exist with an associated maximum stage less than the stage associated with the first task, prevent the first task from executing, and upon determining that another pending or currently running task does not exist with an associated maximum stage less than the stage associated with the first task, allow the first task to be executed.

15. The system of claim 14, wherein the task definition list comprises an XML file defining a single node for each task in the plurality of tasks.

16. The system of claim 15, wherein the node for each task comprises a task ID attribute, a stage attribute, and a maximum stage attribute.

17. The system of claim 15, wherein the task dependencies management module is further configured to load the XML file defining the plurality of tasks upon initiation of a group or batch comprising the plurality of tasks.

18. The system of claim 14, wherein the task dependencies management module is further configured to track completed tasks in an executed task list.

19. The system of claim 14, wherein the task dependencies management module implements an API and wherein receiving a request to execute the first task comprises receiving a request for permission to execute the first task from an execution resource through the API.

20. The system of claim 19, wherein the execution resource further provides notification to the task dependencies management module of a completion of a task in the plurality of tasks through the API.

* * * * *